United States Patent
Hebert et al.

(10) Patent No.: US 9,607,617 B2
(45) Date of Patent: Mar. 28, 2017

(54) CONCEPT CLOUD IN SMART PHONE APPLICATIONS

(71) Applicant: Nuance Communications, Inc., Burlington, MA (US)

(72) Inventors: Matthieu Hebert, Melocheville (CA); Jean-Philippe Robichaud, Mercier (CA)

(73) Assignee: Nuance Communications, Inc., Burlington, MA (US)

( * ) Notice: Subject to any disclaimer, the term of this patent is extended or adjusted under 35 U.S.C. 154(b) by 111 days.

(21) Appl. No.: 13/855,117

(22) Filed: Apr. 2, 2013

(65) Prior Publication Data
US 2014/0297283 A1   Oct. 2, 2014

(51) Int. Cl.
*G10L 15/18* (2013.01)
*G10L 15/22* (2006.01)
*G10L 15/26* (2006.01)

(52) U.S. Cl.
CPC ............ *G10L 15/18* (2013.01); *G10L 15/22* (2013.01); *G10L 15/265* (2013.01); *G10L 15/1822* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 6,311,159 B1 * | 10/2001 | Van Tichelen | ......... | G10L 15/18 704/251 |
| 6,327,593 B1 * | 12/2001 | Goiffon | ............. | G06F 17/30336 |
| 6,829,603 B1 * | 12/2004 | Chai | ................. | G06F 17/30684 |
| 7,197,460 B1 * | 3/2007 | Gupta | ..................... | G10L 15/22 704/251 |
| 7,725,322 B2 * | 5/2010 | Kwak | ................. | G10L 15/1822 704/258 |
| 7,917,888 B2 * | 3/2011 | Chong | ...................... | G06F 8/20 717/102 |
| 7,949,529 B2 * | 5/2011 | Weider | ............. | G06F 17/30864 704/235 |
| 8,306,814 B2 * | 11/2012 | Dobry | .................... | G10L 17/02 704/231 |

(Continued)

OTHER PUBLICATIONS

Gieselmann "Reference Resolution Mechanisms in Dialogue Management", Proceedings of the 8th Workshop on the Semantics and Pragmatics of Dialogue, Barcelona, Spain, Jul. 1, 2004.*

*Primary Examiner* — Jialong He
*Assistant Examiner* — Yi-Sheng Wang
(74) *Attorney, Agent, or Firm* — Banner & Witcoff, Ltd.

(57) ABSTRACT

An automated arrangement is described for conducting natural language interactions with a human user. A user interface is provided for user communication in a given active natural language interaction with a natural language application during an automated dialog session. An automatic speech recognition (ASR) engine processes unknown user speech inputs from the user interface to produce corresponding speech recognition results. A natural language concept module processes the speech recognition results to develop corresponding natural language concept items. A concept item storage holds selected concept items for reuse in a subsequent natural language interaction with the user during the automated dialog session.

18 Claims, 5 Drawing Sheets

(56) References Cited

U.S. PATENT DOCUMENTS

| | | | | |
|---|---|---|---|---|
| 8,346,563 | B1* | 1/2013 | Hjelm | G10L 15/1822 379/88.01 |
| 8,719,024 | B1* | 5/2014 | Moreno | G10L 15/04 704/257 |
| 2002/0133354 | A1* | 9/2002 | Ross | G10L 15/30 704/275 |
| 2005/0135571 | A1* | 6/2005 | Bangalore | G06Q 10/06311 379/88.01 |
| 2012/0245944 | A1* | 9/2012 | Gruber | G06F 17/3087 704/270.1 |
| 2012/0253802 | A1* | 10/2012 | Heck | G06F 17/30528 704/235 |
| 2013/0205370 | A1* | 8/2013 | Kalgi | H04W 12/10 726/3 |
| 2013/0275164 | A1* | 10/2013 | Gruber | G10L 17/22 705/5 |
| 2014/0019522 | A1* | 1/2014 | Weng | G06F 17/30964 709/203 |
| 2014/0257793 | A1* | 9/2014 | Gandrabur | G10L 15/22 704/9 |
| 2014/0257794 | A1* | 9/2014 | Gandrabur | G10L 15/1815 704/9 |
| 2014/0365885 | A1* | 12/2014 | Carson | G06F 3/167 715/708 |

\* cited by examiner

CONCEPT CLOUD IN SMART PHONE APPLICATIONS

TECHNICAL FIELD

The invention generally relates to conducting natural language interactions with a human user during an automated dialog session on a mobile device such as a smartphone.

BACKGROUND ART

An automatic speech recognition (ASR) system determines a semantic meaning of a speech input. Typically, the input speech is processed into a sequence of digital speech feature frames. Each speech feature frame can be thought of as a multi-dimensional vector that represents various characteristics of the speech signal present during a short time window of the speech. For example, the multi-dimensional vector of each speech frame can be derived from cepstral features of the short time Fourier transform spectrum of the speech signal (MFCCs)—the short time power or component of a given frequency band—as well as the corresponding first- and second-order derivatives ("deltas" and "delta-deltas"). In a continuous recognition system, variable numbers of speech frames are organized as "utterances" representing a period of speech followed by a pause, which in real life loosely corresponds to a spoken sentence or phrase.

The ASR system compares the input utterances to find statistical acoustic models that best match the vector sequence characteristics and determines corresponding representative text associated with the acoustic models. More formally, given some input observations A, the probability that some string of words W were spoken is represented as P(W|A), where the ASR system attempts to determine the most likely word string:

$$\hat{W} = \underset{W}{\operatorname{argmax}} P(W \mid A)$$

Given a system of statistical acoustic models, this formula can be re-expressed as:

$$\hat{W} = \underset{W}{\operatorname{argmax}} P(W)P(A \mid W)$$

where P(A|W) corresponds to the acoustic models and P(W) reflects the prior probability of the word sequence as provided by a statistical language model.

The acoustic models are typically probabilistic state sequence models such as hidden Markov models (HMMs) that model speech sounds using mixtures of probability distribution functions (Gaussians). Acoustic models often represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the models are organized together as words, phrases, and sentences, additional language-related information is also typically incorporated into the models in the form of a statistical language model.

The words or phrases associated with the best matching model structures are referred to as recognition candidates or hypotheses. A system may produce a single best recognition candidate—the recognition result—or multiple recognition hypotheses in various forms such as an N-best list, a recognition lattice, or a confusion network. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

Recently, ASR technology has advanced enough to have applications that are implemented on the limited footprint of a mobile device. This can involve a somewhat limited stand-alone ASR arrangement on the mobile device, or more extensive capability can be provided in a client-server arrangement where the local mobile device does initial processing of speech inputs, and possibly some local ASR recognition processing, but the main ASR processing is performed at a remote server with greater resources, then the recognition results are returned for use at the mobile device.

Natural Language Processing (NLP) and Natural Language Understanding (NLU) involve using computer processing to extract meaningful information from natural language inputs such as human generated speech and text. One recent application of such technology is processing speech and/or text queries in mobile devices such as smartphones.

FIG. 1 A-C shows some example screen shots of the user interface 100 of one such mobile device application, Dragon Go!, which processes speech query inputs and obtains simultaneous search results from a variety of top websites and content sources. Such applications require adding a natural language understanding component to an existing web search algorithm in order to extract semantic meaning from the input queries. This can involve using approximate string matching to discover semantic template structures. One or more semantic meanings can be assigned to each semantic template. Parsing rules and classifier training samples can be generated and used to train NLU models that determine query interpretations (sometimes referred to as query intents).

SUMMARY

Embodiments of the present invention are directed to an automated arrangement for conducting natural language interactions with a human user during an automated dialog session. A user interface is provided for user communication in a given active natural language interaction with a natural language application. An automatic speech recognition (ASR) engine processes unknown user speech inputs from the user interface to produce corresponding speech recognition results. A natural language concept module processes the speech recognition results to develop corresponding natural language concept items. A concept item storage holds selected concept items for reuse in a subsequent natural language interaction with the user during the automated dialog session.

The user interface may provide to the human user an interactive display of concept items held in the concept item storage. For example, this may be based on one or more of an ordered list display, a relative relationships cloud display, a user selectable concept item tab in a multi-tab layout portion of the user interface, and/or a notification overlay mechanism in a text display portion of the user interface. The interactive display may be adapted to allow the human user to drag a displayed concept item to a user selected natural language interaction displayed on the user interface for use therein or to copy a displayed concept item to clipboard memory and then paste the concept item from the clipboard memory in a user selected natural language interaction displayed on the user interface for use therein.

The subsequent natural language interaction may include a user modification of a given information field of a concept item in the concept item storage or using one or more information fields of a concept item in the concept item storage to develop a new natural language concept item for the subsequent natural language interaction. The user interface may be an interface on a smartphone device.

DETAILED DESCRIPTION

Embodiments of the present invention are directed to an automated arrangement for conducting natural language interactions with a human user during an automated dialog session. Natural language concept items are extracted from ASR results and stored in a concept item storage such as a concept cloud for convenient reuse or modification in another user dialog interaction later in the same session.

Figures 1A, 1B, 1C:
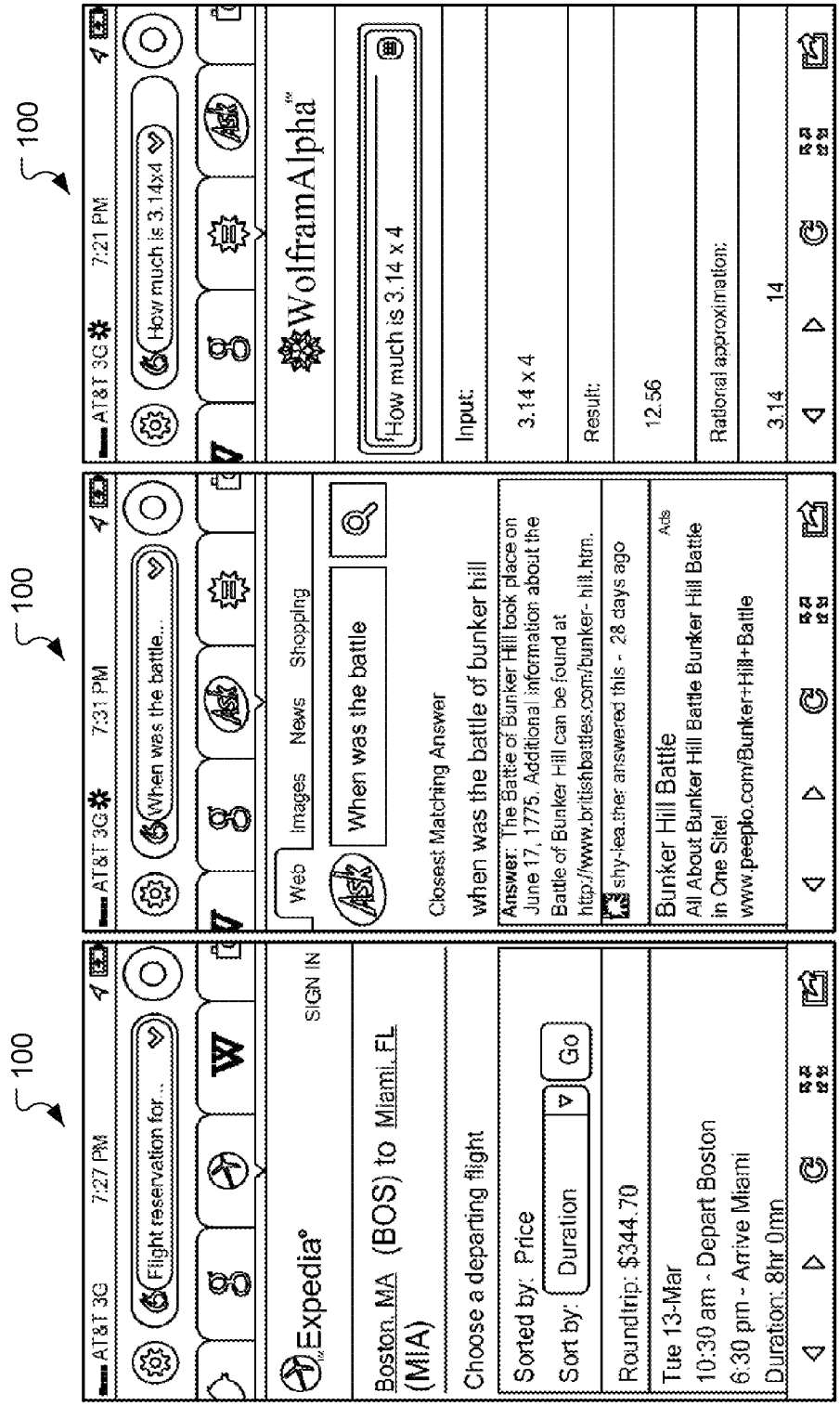
FIG. 1 A-C shows various example screen shots from a natural language dialog application for a mobile device.
Figure 2:
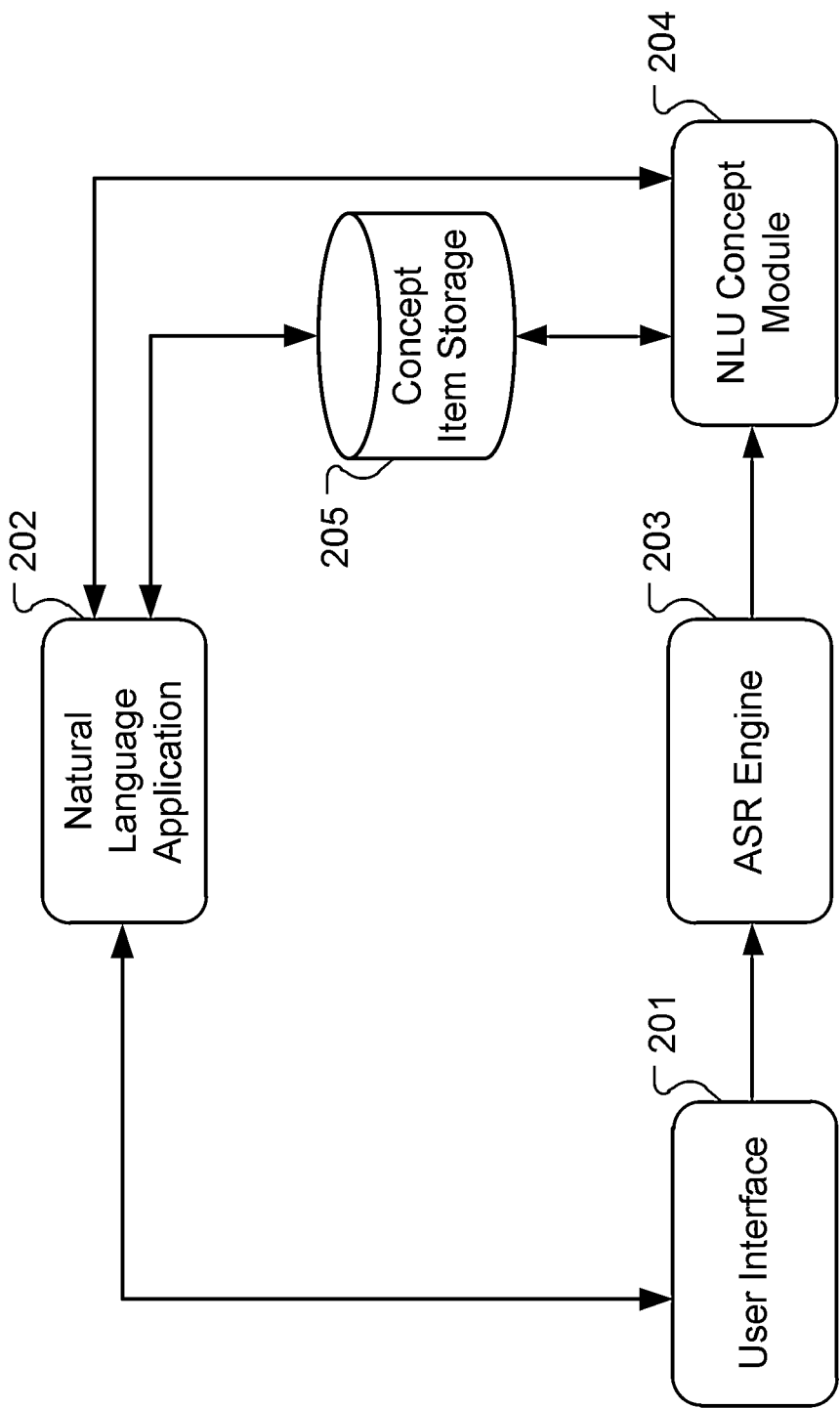
FIG. 2 shows various elements in an automated arrangement for conducting natural language interactions by reusing stored concept items according to an embodiment of the present invention.
Figure 3:
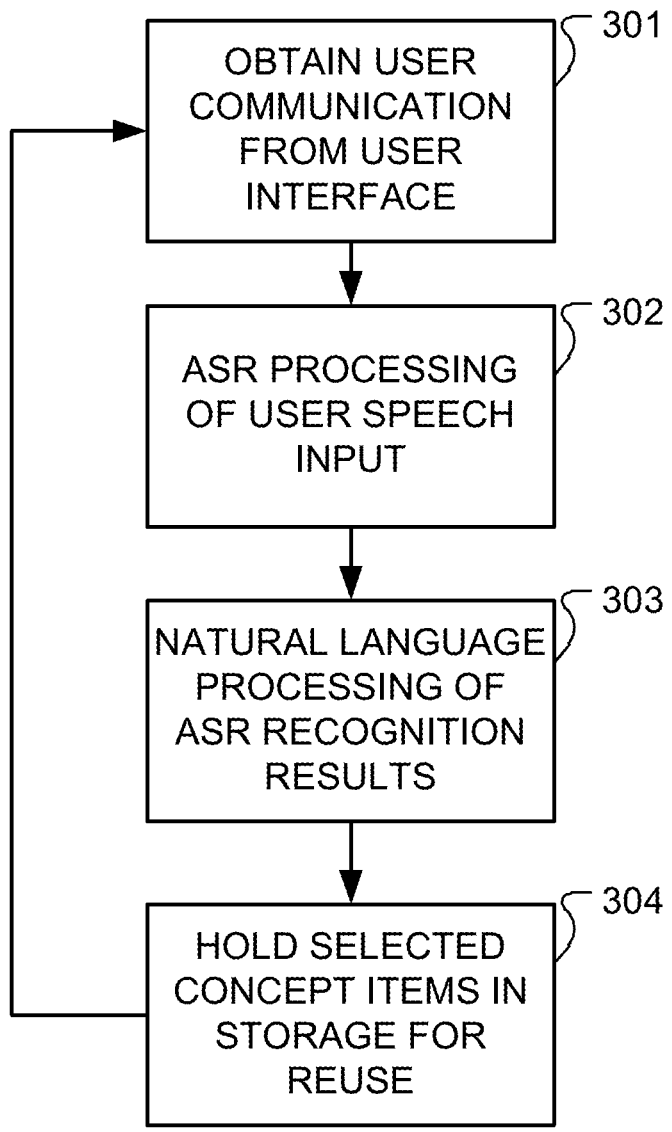
FIG. 3 shows various functional steps in an automated natural language dialog arrangement according to an embodiment of the present invention.

FIG. 2 shows various elements and FIG. 3 shows various functional steps in an automated arrangement for conducting natural language interactions with a human user during an automated dialog session according to an embodiment of the present invention. A user interface 201, for example on a smartphone device, is provided for user communication in a given active natural language interaction with a natural language application 202. That is, the user interacts with the natural language application 202 during a given dialog session, including entering unknown natural language speech inputs via the user interface 201 for processing by the natural language application 202, step 301. An automatic speech recognition (ASR) engine 203 processes the user speech inputs from the user interface 201 to produce corresponding speech recognition results, step 302. A natural language concept module 204 processes the speech recognition results to develop corresponding natural language concept items, step 303.

A concept item storage 205 holds selected concept items, step 304, for later reuse. For example, the natural language application 202 may reuse concept items in the concept item storage 205 in a subsequent natural language interaction with the user during the same automated dialog session, or in a later session. While there is not necessarily any particular time limit to how long concept items are held in the concept item storage 205, in some embodiments there may be time-base rules to "age" the concepts; e.g., deleting concept items after a given length of time. And the concept items in the concept item storage 205 should be understood as being available to other applications, for example, for text-only interactions in other applications.

Figure 4A:
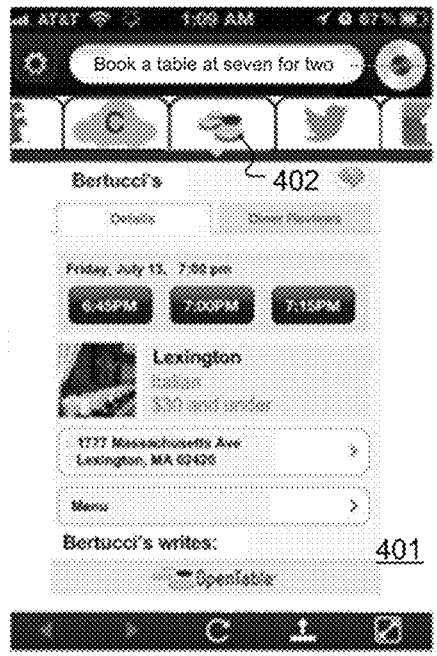
FIG. 4 A-B shows various example screen shots from an automated natural language dialog arrangement for a mobile device according to an embodiment of the present invention.
Figure 4B:

FIGS. 4 A-B and 5 A-B show various example screen shots from an automated natural language arrangement for a mobile device according to an embodiment of the present invention. FIG. 4A shows a user interface 401 for a smartphone mobile device which has multiple application selection tabs for various different natural language dialog applications. In this example, the user initially starts the application and says: "Book a table at seven for two persons at Bertucci's in Lexington". This opens a first natural language dialog application 402 for the OpenTable service with the corresponding recognized text 403 being displayed on the user interface 401. The system creates a Restaurant concept item containing various information fields such as Name: Bertucci's, Location: Lexington, Size: Two, Time: 7:00 pm, etc. which is stored in a concept cloud (on the device or remotely). This stored concept item also can be viewed by the user selecting a concept item tab 404 which displays the stored concept item for Restaurant 405, as shown in FIG. 4B.

Figure 5A:
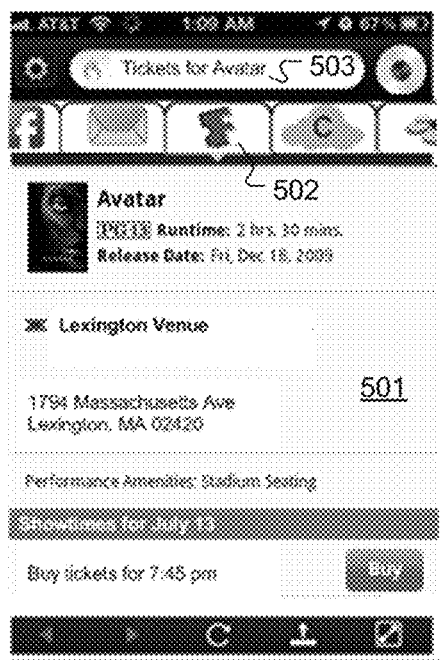
FIG. 5 A-B shows further example screen shots from the embodiment shown in FIGS. 4 A-B.
Figure 5B:

Later after some unrelated queries to the smartphone, the user says: "Tickets for Avatar." As shown in FIG. 5A, this opens a second natural language dialog application 502 for the Fandango movie information service with the corresponding recognized text 503 being displayed on the user interface 501. This creates a new concept item for Movie in the concept cloud which initially has only the movie title, "Avatar," in it. The user wants a movie ticket reservation to be made for two persons who are near Bertucci's in Lexington around 45 minutes to an hour after 7:00 pm. In previous arrangements the user would need to re-enter by hand all the needed information. But according to an embodiment of the present invention, the user can grab the stored concept item for Restaurant 405 under the concept cloud tab 404 and drag and drop it onto the current Movie 502 concept item to automatically populate it with the information attributes from the stored Restaurant concept item 405, and also automatically altering the content in the Fandango natural language dialog application 502.

In some embodiments, the user may be elect to select a given concept item 405 or 505 in the concept item list and copy it to the clipboard memory, then select a tab for a given natural language dialog application and paste the concept item into that application to create a second concept item for that application based on the attribute information in the first concept item. It should be understood that the use of concept items as described herein is not limited to sharing concept items within just one application, and there is not conceptual limit that prevents sharing a concept item in one application with another totally different application (e.g., by copy-and paste) as long as they both are compatible with the same underlying cloud item arrangement.

Figure 6B:
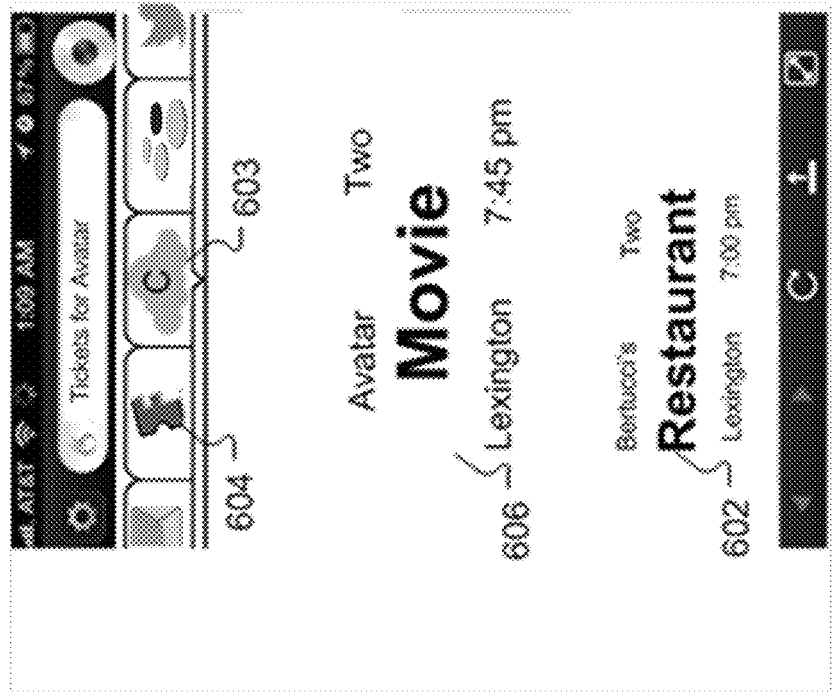
FIG. 6 A-B shows various example screen shots from another automated natural language dialog arrangement for a mobile device according to an embodiment of the present invention.
Figure 6A:
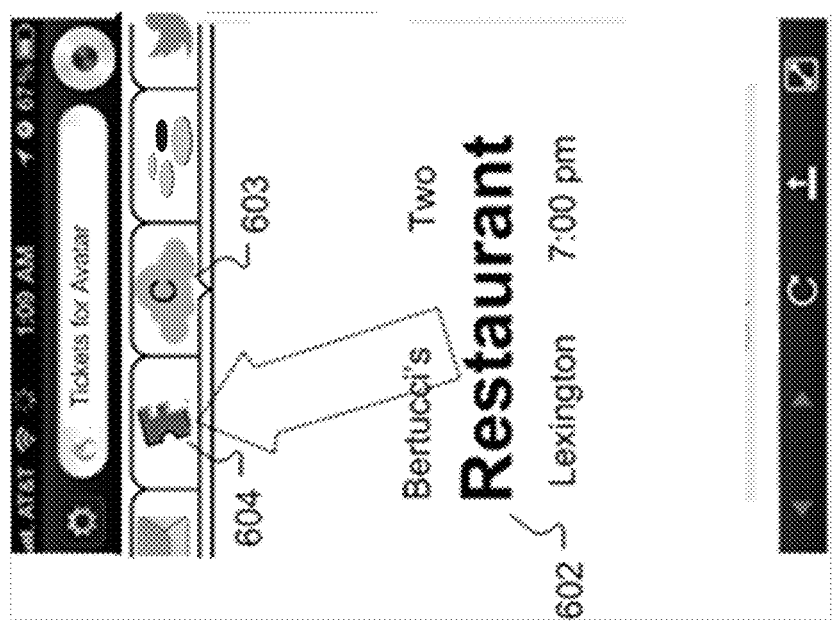

FIG. 6 A shows an example of dragging another form of the Restaurant concept item 602 under the concept cloud tab 603 onto the Fandango tab 604, where the Restaurant concept item 602 is displayed in the specific form of a relative relationships cloud display where the specific concept "Restaurant" is in large bold type in the center around which the information field values are clustered in smaller fonts. In the specific example shown in FIG. 6A, the user drags the Restaurant concept item 602 onto the Fandango tab 604 to create a Movie concept item 606. In FIG. 6B, the Movie concept item 606 is shown larger and centered on the user interface 601 and the Restaurant concept item 602 is shown smaller away from the center to reflect that the movie ticketing dialog is the current natural language dialog interaction, while the restaurant interaction occurred in the past. In this example, dragging and dropping the Restaurant concept item 602 pulled all of its attributes for use in the new Movie concept item 606. But in some embodiments, the user may be able to selectively grab and drag just one or more sub-parts of a given concept item. So for example, the user might decide to drag only the Location attribute (to get traffic information in that vicinity).

The foregoing example also shows that an ontology exists between related concept items. That is that there is a relationship between a Restaurant (having a location, party size, date+time) and a Movie (having similar characteristics) such that the concept item for one can be cast into a concept item for the other and cloning common values. The ontology/relationships of the concept items may usefully reflect aspects of their real world relationships. For example, one cannot eat and go to the movies at the same time. For example, depending on the Time of the Restaurant concept item, (or other any concept that entails a constraint), one might suggest an earlier or later movie. If the user wants to refine a Movie concept item using Restaurant concept item, then one or more choices can happen:

- Restaurant concept item may be set by the user at a given time, say 6:00 pm, and then the system could use (by default) set a later time for the Movie concept item (by ~1 hour).
- Or when the Restaurant concept item is set later, say at 9:00 pm, then the system should know that a movie is about 2 hours and so, the Movie concept item should start before the Restaurant time at 7:00 pm.
- If the Restaurant concept item is at set at a time when it would make sense for the movie to either precede or follow, say at 8:00 pm, then 8:00 pm could be used by the system to do the retrieval, letting the user negotiate their agenda.

Embodiments of the present invention also are well suited to make modifications of already existing concept items by allowing easy editing. If a user says "Book at table at seven for two persons at Bertucci's in Lexington," but the system initially makes the time for the corresponding Restaurant concept item as 10:00 pm, then easy editing (by text or speech) would be extremely useful to correct the problem. For example, a long-press on the Time field for the Restaurant concept item could allow easy entering of extremely specific information, thus reducing the system error rate. Or the user could simply click on one field to edit or change it. Similarly, the user may be able to delete a concept item or merge two concept items together. Once a user modification is made of a concept item, then all the tabs/applications that use that concept are automatically updated. In specific embodiments such behavior can be a default setting that may or may not be changeable by the user and/or system software.

Another example of casting an existing stored concept item into a new concept item starts with the user saying "Watch Harry Potter Deathly Hallows." This brings up a the movie and user starts to watch. After watching on-and-off, the user may want to buy the book, saying: "Buy a book on Amazon." The Amazon application is brought up in the user interface and the user can now recall the Movie concept from the concept cloud of stored concept items and drop it on the Amazon tab, casting the Movie concept item into a new Book concept item.

Specific concept items may also be populated with any relevant meta-data. For example, a concept item for the city called "Montreal, QC" would have attributes such as: Latitude, Longitude, Airports, ZipCodes, etc. A Brief Description attribute would be "Montreal, QC" and the concept item icon would be map-like.

Stored concept items may also be useful for resolving anaphora in on-going natural language interactions. For example, if a user says "Get directions to Medford," a concept item is created for Medford_Mass. and stored in the concept cloud. If the next interaction is "See Avengers there," the system supports resolving this anaphora and the Movie concept item is casted with attributes from the existing Medford_Mass. concept item in the concept cloud storage. Later if the user receives a phone call that other people are in Burlington rather than Medford, the user can elect to update the Burlington_Mass. concept item and revise the Movie concept item attributes then for watching Avatar in Burlington.

Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A system comprising:
at least one computer processor; and
at least one memory storing instructions that, when executed by the at least one processor, cause the system to perform:
processing, by an automatic speech recognition (ASR) engine, a first speech input to produce a first speech recognition result;
generating a first natural language concept item comprising a first plurality of information fields, wherein each information field of the first plurality of information fields comprises information associated with the first speech recognition result, and the first natural language concept item is associated with a first natural language application;
processing, by the ASR engine, a second speech input to produce a second speech recognition result;
generating, based on the second speech recognition result, a second natural language concept item comprising a second plurality of information fields, wherein the second natural language concept item is associated with a second natural language application;
determining that a first information field of the first plurality of information fields corresponds to a second information field of the second plurality of information fields; and
refining a time field value in the second information field based on a time field value in the first information field.

2. The system of claim 1, wherein the first natural language concept item and the second natural language concept item are configured for reuse in subsequent dialog sessions.

3. The system of claim 2, wherein the instructions further cause the system to perform displaying an interactive user interface comprising a list indicating the first natural language concept item and the second natural language concept item.

4. The system of claim 3, wherein the interactive user interface comprises a user selectable concept item tab in a multi-tab layout portion of the interactive user interface.

5. The system of claim 1, wherein the instructions further cause the system to perform:
activating the first natural language application after processing the first speech input;
operating the first natural language application based on the first natural language concept item;
activating the second natural language application after processing the second speech input; and
operating the second natural language application based on the second natural language concept item.

6. The system of claim 1, wherein the instructions further cause the system to perform modifying one or more of the information fields of the second plurality of information fields in response to receiving a user input.

7. The system of claim 1, wherein the instructions that cause the system to perform generating the second natural language concept item comprise instructions that cause the system to perform generating the second natural language concept item based on a predetermined default value associated with an information field of the first plurality of information fields.

8. The system of claim 1, wherein the instructions that cause the system to perform refining the time field value in the second information field based on the time field value in the first information field comprise instructions that cause the system to perform:
modifying, based on a relationship between the first natural language application and the second natural language application, information in the first information field to form a modified information; and
populating the second information field with the modified information.

9. The system of claim 1, wherein the time field value in the first information field comprises a time, and wherein the instructions that cause the system to perform refining the time field value in the second information field based on the time field value in the first information field comprise instructions that cause the system to perform:
adjusting the time based on a relationship between the first natural language application and the second natural language application to form an adjusted time; and
replacing the time field value in the second information field with the adjusted time.

10. A computer-implemented method employing at least one hardware implemented computer processor for conducting natural language interactions, the method comprising:
processing, by an automatic speech recognition (ASR) engine, a first speech input to produce a first speech recognition result;
generating a first natural language concept item comprising a first plurality of information fields, wherein each information field of the first plurality of information fields comprises information associated with the first speech recognition result, and the first natural language concept item is associated with a first natural language application;
processing, by the ASR engine, a second speech input to produce a second speech recognition result;
generating, based on the second speech recognition result, a second natural language concept item comprising a second plurality of information fields, wherein the second natural language concept item is associated with a second natural language application;
determining that a first information field of the first plurality of information fields corresponds to a second information field of the second plurality of information fields; and
modifying a time field value in the second information field based on a time field value from the first information field.

11. The method according to claim 10, wherein the first natural language concept item and the second natural language concept item are configured for reuse in subsequent dialog sessions.

12. The method according to claim 11, further comprising displaying an interactive user interface comprising a list indicating the first natural language concept item and the second natural language concept item.

13. The method according to claim 12, wherein the interactive user interface comprises a user selectable concept item tab in a multi-tab layout portion of the interactive user interface.

14. The method according to claim 10, further comprising:
activating the first natural language application after processing the first speech input;
operating the first natural language application based on the first natural language concept item;
activating the second natural language application after processing the second speech input; and operating the second natural language application based on the second natural language concept item.

15. The method according to claim 10, wherein the second natural language concept item is generated based on a predetermined default value associated with one of the information fields of the first plurality of information fields.

16. A method comprising,
processing a first speech input to produce a first speech recognition result;
generating, based on the first speech recognition result, a first natural language concept item comprising one or more first information fields, wherein the first natural language concept item corresponds to a first application;
populating the first information fields with recognized text in the first speech recognition result;
receiving a user selection of the first natural language concept item and a user selection of a second application;
in response to receiving the user selection, generating a second natural language concept item comprising one or more second information fields, wherein the second natural language concept item corresponds to the second application; and
refining a time field value in the second information fields based on time field value in the first information fields.

17. The method of claim 16, wherein receiving the user selection of the first natural language concept item and the user selection of the second application comprises determining that the first natural language concept item was dragged to a location associated with the second application.

18. The method of claim 16, wherein receiving the user selection of the first natural language concept item and the user selection of the second application comprises receiving a user selection to copy the first natural language concept item to a clipboard memory and then paste the first natural language concept item from the clipboard memory and to the second application.

* * * * *